(12) United States Patent
Liao et al.

(10) Patent No.: US 9,523,874 B2
(45) Date of Patent: Dec. 20, 2016

(54) METHOD FOR PRODUCING 2D/3D SWITCHABLE INTEGRAL IMAGING LIQUID CRYSTAL CELL, AND LIQUID CRYSTAL CELL

(71) Applicant: SHENZHEN CHINA STAR OPTOELECTRONICS TECHNOLOGY CO., LTD., Shenzhen, Guangdong (CN)

(72) Inventors: Qiaosheng Liao, Shenzhen (CN); Chih-Ming Yang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/241,377

(22) PCT Filed: Jan. 17, 2014

(86) PCT No.: PCT/CN2014/070766
§ 371 (c)(1),
(2) Date: Feb. 26, 2014

(87) PCT Pub. No.: WO2015/074333
PCT Pub. Date: May 28, 2015

(65) Prior Publication Data
US 2015/0253597 A1    Sep. 10, 2015

(30) Foreign Application Priority Data
Nov. 21, 2013 (CN) .......................... 2013 1 0594892

(51) Int. Cl.
G02F 1/1335    (2006.01)
G02F 1/1333    (2006.01)
(Continued)

(52) U.S. Cl.
CPC ............. *G02F 1/1333* (2013.01); *G02B 27/22* (2013.01); *G02B 27/2214* (2013.01);
(Continued)

(58) Field of Classification Search
CPC .................... G02F 1/1333; G02F 1/137; G02F 2001/133357; G02F 1/29; G02F 2001/294; G02B 27/22; G02B 27/2214; G02B 27/26; Y10T 1256/1039
(Continued)

(56) References Cited

U.S. PATENT DOCUMENTS 6,069,650 A     5/2000  Battersby ........................ 348/59
2012/0069279 A1*  3/2012  Harrold ................ G02B 3/0006
                                                            349/119
(Continued)

FOREIGN PATENT DOCUMENTS

CN    201096991 Y    8/2008
CN    102305984 A    1/2012
(Continued)

OTHER PUBLICATIONS

International Search Report dated Sep. 8, 2014, issued to International Application No. PCT/CN2014/070766.
(Continued)

*Primary Examiner* — Charles Chang
(74) *Attorney, Agent, or Firm* — Stein IP, LLC

(57) ABSTRACT

The present disclosure discloses a method for producing a 2D/3D switchable integral imaging liquid crystal cell, and a liquid crystal cell, the method comprising the following steps: 1) coating a UV adhesive layer on a lower substrate; 2) imprinting grooves on the UV adhesive layer by using an array and then UV-curing the UV adhesive layer; 3) coating a lower transparent conductive film on the cured UV adhesive layer, and planarizing the grooves; and 4) forming a
(Continued)

liquid crystal cell with the lower substrate and an upper substrate which is coated with an upper transparent conductive film on a lower surface thereof. 2D and 3D displays are switchable in the liquid crystal cell obtained by the method of the present disclosure, thereby achieving comparable displays of 2D and 3D images through simple and convenient operations.

10 Claims, 2 Drawing Sheets

(51) Int. Cl.
    *G02B 27/22*     (2006.01)
    *G02B 27/26*     (2006.01)
    *G02F 1/137*     (2006.01)
    *G02F 1/29*     (2006.01)

(52) U.S. Cl.
    CPC ............ *G02B 27/26* (2013.01); *G02F 1/137* (2013.01); *G02F 1/29* (2013.01); *G02F 2001/133357* (2013.01); *G02F 2001/294* (2013.01); *Y10T 156/1039* (2015.01)

(58) Field of Classification Search
    USPC .......................................................... 349/15
    See application file for complete search history.

(56) References Cited

U.S. PATENT DOCUMENTS

2012/0293735 A1* 11/2012 Jung .................. G02B 27/2214
                                                                                            349/15
2012/0314143 A1* 12/2012 Shin ....................... B32B 37/02
                                                                                            349/15

FOREIGN PATENT DOCUMENTS

| CN | 102508324 A | 6/2012 |
| CN | 102540558 A | 7/2012 |
| WO | WO 2005/073760 A1 | 8/2005 |

OTHER PUBLICATIONS

Chinese Office Action dated Jan. 21, 2016, issued by the Chinese Patent Office in corresponding application CN 201310594892.8.

* cited by examiner (a)

(b)

(c)

METHOD FOR PRODUCING 2D/3D SWITCHABLE INTEGRAL IMAGING LIQUID CRYSTAL CELL, AND LIQUID CRYSTAL CELL

FIELD OF THE INVENTION

The present disclosure relates to a method for producing an integral imaging liquid crystal cell, in particular to a method for producing a 2D/3D switchable integral imaging liquid crystal cell, and a liquid crystal cell.

BACKGROUND OF THE INVENTION

Generally, liquid crystal cells in the prior art are incompatible with 2D and 3D displays. Grating arrays for integral imaging are normally physically-structured convex lens arrays. Liquid crystal cells for 3D images will generate blurred images with degraded resolution when used for displaying 2D images. Moreover, methods for producing liquid crystal cells are generally complex and inconvenient to operate.

SUMMARY OF THE INVENTION

A technical problem to be solved by the present disclosure is to provide a method for producing a 2D/3D switchable integral imaging liquid crystal device, which allows switching between the display of a 2D image and display of a 3D image to realize display compatibility of 2D and 3D images in a manner which is easy and convenient to operate.

The technical solution adopted in the present disclosure is a method for producing a 2D/3D switchable integral imaging liquid crystal cell, which includes the following steps:

1) coating a UV adhesive layer on a lower substrate;
2) imprinting grooves on the UV adhesive layer by using an array and then UV-curing the UV adhesive layer;
3) coating a lower transparent conductive film on the cured UV adhesive layer, and planarizing the groove; and
4) forming a liquid crystal cell with the lower substrate and an upper substrate which is coated with an upper transparent conductive film on a lower surface thereof.

In one embodiment of the present disclosure, a voltage is applied to the liquid crystal cell when 3D images are displayed; and no voltage is applied when 2D images are displayed. Therefore, displays of 3D and 2D images can be achieved through use and non-use of voltage, respectively.

When a voltage is applied, two electrodes are formed by the lower transparent conductive film and the upper transparent conductive film. As the lower transparent conductive film electrodes inside the grooves of the UV adhesive layer have different distances to the corresponding upper transparent conductive film electrodes on the lower surface of the upper substrate, electric fields of different intensities will be generated. Therefore, refractive indexes of light passing through these two transparent conductive films are also different. Hence, light beams will be deflected at different deflection angles, and therefore a 3D image will be presented. The distances between the transparent conductive film electrodes in the grooves and the corresponding transparent conductive film electrodes below the upper substrate are different, which leads to differences in intensities of electric fields, thereby resulting in different reflecting angles after refraction.

When no voltage is applied, the deflection angles of the light beams passing through the liquid crystal cell are the same, and therefore a 2D image is presented. When no voltage is applied, the refractive indexes are the same, and the deflection angles are substantially the same under the effect of liquid crystal layer.

Compared with the prior art, the method for producing a 2D/3D switchable integral imaging liquid crystal cell according to the present disclosure has the following advantages. Through the arrangement of two transparent conductive films, two electrodes are formed by the two transparent conductive films when a voltage is applied. The existence of the grooves on the UV adhesive layer leads to different distances between the two transparent conductive film electrodes, so as to generate electric fields of different intensities between the two electrodes and different refractive indexes of light. As a result, light beams are deflected to different degrees and thus present different states when passing through the liquid crystal cell, and therefore a 3D image is presented. When no voltage is applied, light beams pass through the liquid crystal cell with substantially the same deflection angle, and thus a 2D image is presented. Therefore, switchable displays between 2D and 3D images can be realized through use or non-use of a voltage. In this manner, the purpose that a liquid crystal cell is capable of not only displaying 3D images but also clearly displaying 2D images can be achieved. That is, switchability and display compatibility between 2D and 3D images are realized.

In one embodiment, the grooves in step 2) are formed as arc-shaped. The arc-shaped grooves can be conveniently imprinted by using a spherical lens array, which is a relatively easy way.

In one preferred embodiment, the transparent conductive film consists of indium tin oxide or indium zinc oxide. Excellent balance in conductivity and transparency can be reached in indium tin oxide or indium zinc oxide, i.e. the transparency thereof is relatively high under good conductivity. However, the transparent conductive films are not limited to be manufactured by these two materials.

In one embodiment, after step 3) and before step 4), a liquid crystal cell sealant is coated, and liquid crystals are filled. In another embodiment, after step 3) and before step 4), a liquid crystal cell sealant is coated, a liquid crystal channel is provided, and a space is reserved; and after step 4), liquid crystals are supplied to fill the reserved space and the channel through suction. The liquid crystals can be filled by choosing one of the two different ways according to requirements and for the convenience in practical operation. However, the liquid crystals can be filled in ways not limited to these two.

In practice, the grooves are planarized on the lower transparent conductive film by using a liquid crystal planarization material in step 3). Preferably, the liquid crystal planarization material is silicon nitride.

Another technical problem to be solved by the present disclosure is to provide an integral imaging liquid crystal cell, which is obtained by using the method as described above according to the present disclosure.

The liquid crystal cell includes an upper substrate and an opposite lower substrate. A UV adhesive layer having grooves thereon is arranged on an upper surface of the lower substrate. A lower transparent conductive film is arranged on the UV adhesive layer. The grooves are filled with a planarization material on the lower transparent conductive film to form a first plane, and an upper transparent conductive film is arranged on a lower surface of the upper substrate to form a second plane. A liquid crystal layer is arranged between the first plane and the second plane. The liquid crystal cell is of simple structure and easy and convenient to obtain.

DETAILED DESCRIPTION OF THE EMBODIMENTS

The present disclosure will be further illustrated below in conjunction with the accompanying drawings and specific examples.

Example 1

Figure 1:
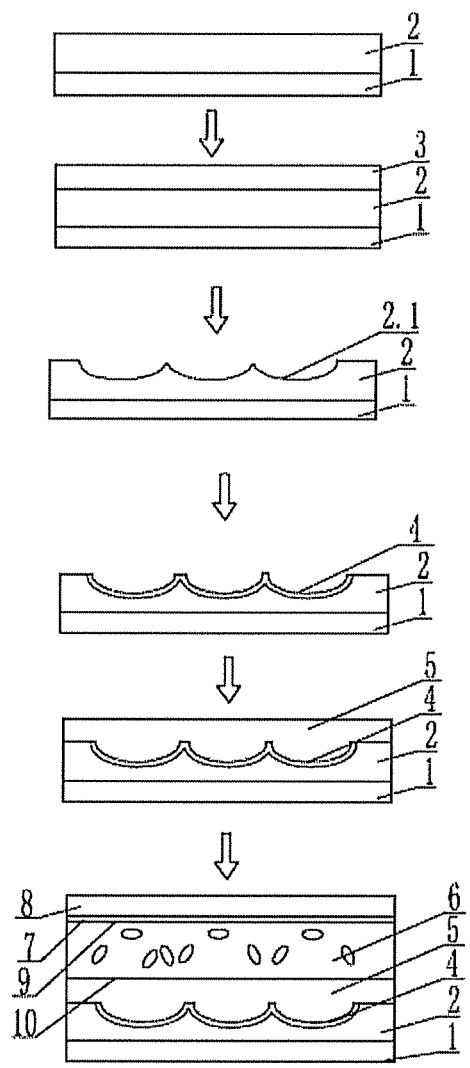
FIG. 1 shows a flowchart of a method for producing a 2D/3D switchable integral imaging liquid crystal cell according to the present disclosure.

FIG. 1 is a flowchart of a method for producing a 2D/3D switchable integral imaging liquid crystal cell according to the present disclosure. The method includes the following steps: 1) coating a UV adhesive layer 2 on a lower substrate 1; 2) imprinting grooves 2.1 on the UV adhesive layer 2 by using an array and then UV-curing the UV adhesive layer 2 with the grooves 2.1 thereon; 3) coating a lower ITO (indium tin oxide) film 4 on the cured UV adhesive layer 2, and planarizing the grooves 2.1 by using silicon nitride; and 4) coating a liquid crystal cell sealant, filling liquid crystals, and then forming a liquid crystal cell by the lower substrate 1 and an upper substrate 8 which is coated with an upper ITO film 7 on a lower surface thereof.

Example 2

The method of producing a 2D/3D switchable integral imaging liquid crystal cell according to the present disclosure includes the following steps: 1) coating a UV adhesive layer 2 on a lower substrate 1; 2) imprinting grooves 2.1 on the UV adhesive layer 2 and then UV-curing the UV adhesive layer 2 with the grooves 2.1 thereon; 3) coating a lower ITO (indium tin oxide) film 4 on the cured UV adhesive layer 2, and planarizing the grooves 2.1 by using silicon nitride; and 4) coating a liquid crystal cell sealant, providing a channel and a reserved space for the liquid crystals, and filling the reserved space and the channel with the liquid crystals through suction after a liquid crystal cell is formed by the lower substrate 1 and an upper substrate 8 which is coated with an upper ITO film 7 on a lower surface thereof.

The UV adhesive can be shadowless adhesive in the examples described above. The non-groove region can be also covered with silicon nitride when the grooves 2.1 are planarized by using silicon nitride. That is, planarization is carried out on the lower ITO (indium tin oxide) film 4 by using silicon nitride. The regions corresponding to the grooves 2.1 can be filled with silicon carbide, and in general, the region of the UV adhesive layer 2 other than the grooves 2.1, i.e. the non-groove region, can be also evenly coated with silicon nitride.

A voltage is applied to the liquid crystal cell when 3D images are displayed, and no voltage is applied to the liquid crystal cell when 2D images are displayed.

When a voltage is applied, as the electrodes on the lower ITO film 4 inside the grooves 2.1 of the UV adhesive layer 2 have different distances to the corresponding electrodes on the upper ITO film 7 on the lower surface of the upper substrate 8, electric fields of different intensities will be generated. In addition, the refractive indexes of light passing through the electrodes on these two ITO films 4 and 7 are different, thereby resulting in different deflection angles of light beams and thus presenting 3D images. When no voltage is applied, light passes through the liquid crystal cell with one single deflection angle, and therefore 2D images are presented.

Figure 2:
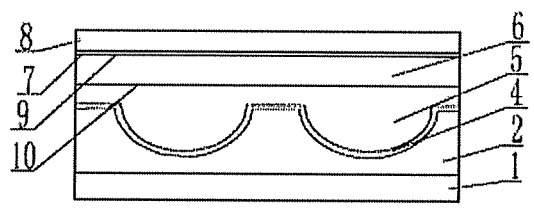
FIG. 2 shows three specific structures of a liquid crystal cell which is obtained by using the method as shown in FIG. 1.
Figure 2:
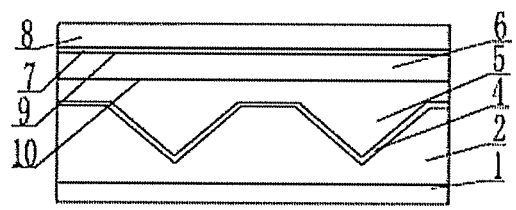
Figure 2:
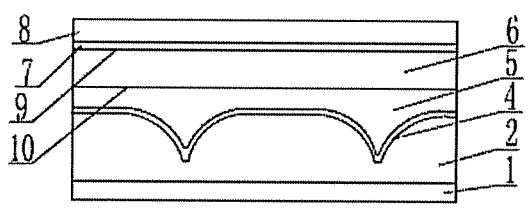

The present disclosure further discloses an integral imaging liquid crystal cell, which can be obtained by using the method for generating a 2D/3D switchable integral imaging liquid crystal cell according to the present disclosure. Shown in (a), (b), and (c) of FIG. 2 are three specific structures of the liquid crystal cell which is obtained by using the method of the present disclosure; however, the liquid crystal cell according to the present disclosure is not limited to these three structures. The liquid crystal cell includes an upper substrate 8 and an opposite lower substrate 1. A UV adhesive layer 2 with grooves 2.1 thereon is arranged on an upper surface of the lower substrate 1. A lower ITO film 4 is arranged on the UV adhesive layer 2. The grooves 2.1 are filled with a planarization material layer 5 on the lower ITO film 4, so as to form a first plane 9. An upper ITO film 7 is arranged on a lower surface of the upper substrate 8 to form a second plane 10. A liquid crystal layer 6 is arranged between the first plane 9 and the second plane 10. In this example, the planarization material layer 5 is a silicon nitride layer.

In the examples above, the grooves 2.1 can be preferably imprinted by using a spherical lens array 3 to be formed as arc-shaped. Other methods can be used also. However, it is simple and convenient to have the arc-shaped grooves 2.1 imprinted on the UV adhesive layer 2 by using the spherical lens array 3, as shown in (a) and (c) of FIG. 2.

Although the present disclosure has been described in conjunction with the preferred examples, it can be understood that various modifications or substitutes can be made to the present disclosure without departing from the scope of the present disclosure. Particularly, all features in all the examples may be combined together as long as structural conflicts do not exist, and combined features to be formed are still within the scope of the present disclosure. The present disclosure is not limited to the specific examples disclosed herein, but encompasses all the technical solutions falling into the scope of the claims.

The invention claimed is:

1. A method for producing a 2D/3D switchable integral imaging liquid crystal cell, comprising the following steps:
   1) coating a UV adhesive layer on a lower substrate;
   2) imprinting grooves on the UV adhesive layer by using an array and then UV-curing the UV adhesive layer;
   3) coating a lower transparent conductive film on the cured UV adhesive layer, and planarizing the grooves; and
   4) forming a liquid crystal cell with the lower substrate and an upper substrate which is coated with an upper transparent conductive film on a lower surface thereof,
   wherein the liquid crystal cell displays 3D images when a voltage is applied thereto, and the liquid crystal cell displays 2D images when no voltage is applied thereto.

2. The method according to claim 1, wherein in step 2) the grooves are formed as arc-shaped.

3. The method according to claim 1, wherein the transparent conductive film consists of indium tin oxide or indium zinc oxide.

4. The method according to claim 1, wherein
   when a voltage is applied to the liquid crystal cell, two electrodes between the upper and lower transparent conductive films are formed, wherein electric fields of different intensities are generated due to different distances between the upper transparent conductive film and the lower transparent conductive film having grooves thereon, and light passing through the two transparent conductive films is directed at different deflection angles due to different refractive indexes, thus presenting 3D images.

5. The method according to claim 1, wherein when no voltage is applied to the liquid crystal cell, light passing through the liquid crystal cell is deflected at one single angle, thus presenting 2D images.

6. The method according to claim 1, wherein the method comprises coating a sealant and filling liquid crystals after step 3) and before step 4).

7. The method according to claim 1, wherein the method comprises planarizing the grooves by a liquid crystal planarization material on the lower transparent conductive film in step 3).

8. The method according to claim 7, wherein the liquid crystal planarization material is silicon nitride.

9. A 2D/3D switchable integral imaging liquid crystal cell obtained by a method comprising the following steps:

1) coating a UV adhesive layer on a lower substrate;

2) imprinting grooves on the UV adhesive layer by using an array and then UV-curing the UV adhesive layer;

3) coating a lower transparent conductive film on the cured UV adhesive layer, and planarizing the grooves; and 4) forming a liquid crystal cell with the lower substrate and an upper substrate which is coated with an upper transparent conductive film on a lower surface thereof, wherein the liquid crystal cell displays 3D images when a voltage is applied thereto, and the liquid crystal cell displays 2D images when no voltage is applied thereto.

10. The integral imaging liquid crystal cell according to claim 9, wherein the liquid crystal cell comprises an upper substrate and an opposite lower substrate, an upper surface of the lower substrate is provided with a UV adhesive layer, which has grooves thereon and is arranged with a lower transparent conductive film, the grooves being filled with a planarization material on the lower transparent conductive film to form a first plane;

an upper transparent conductive film is arranged on a lower surface of the upper substrate to form a second plane; and a liquid crystal layer is arranged between the first plane and the second plane.

* * * * *